United States Patent
Lemay et al.

(10) Patent No.: US 9,844,908 B1
(45) Date of Patent: Dec. 19, 2017

(54) SONOTRODE FOR THE ULTRASONIC WELDING OF PLASTIC COMPONENTS OF AN ELECTRONIC CIGARETTE

(71) Applicant: G.D SOCIETA' PER AZIONI, Bologna (IT)

(72) Inventors: Michael Andre Lemay, Midlothian, VA (US); Giovanni Madera, Bologna (IT); Carlo Moretti, Bologna (IT); Marco Mazzoni, Bologna (IT); Massimo Sartoni, Bologna (IT); Luca Federici, Bologna (IT)

(73) Assignee: G.D SOCIETA' PER AZIONI, Bologna (IT)

( * ) Notice: Subject to any disclaimer, the term of this patent is extended or adjusted under 35 U.S.C. 154(b) by 0 days.

(21) Appl. No.: 15/230,543

(22) Filed: Aug. 8, 2016

(30) Foreign Application Priority Data

May 26, 2016 (IT) .......................... 102016000054263

(51) Int. Cl.
  *B32B 37/00* (2006.01)
  *B29C 65/08* (2006.01)
  *B29L 31/34* (2006.01)

(52) U.S. Cl.
  CPC .......... *B29C 65/08* (2013.01); *B29L 2031/34* (2013.01)

(58) Field of Classification Search
  CPC ........ B29C 65/08; B29C 65/02; B65B 51/225
  USPC .................................. 156/73.1, 580.1, 580.2
  See application file for complete search history.

(56) References Cited

U.S. PATENT DOCUMENTS

| | | | | |
|---|---|---|---|---|
| 5,922,170 A | * | 7/1999 | Gerdes | B29C 65/08 156/580.1 |
| 8,215,359 B2 | * | 7/2012 | Jalbert | B23K 20/106 156/378 |
| 8,216,408 B2 | * | 7/2012 | Vogler | B29C 65/081 156/580.2 |
| 9,079,358 B2 | * | 7/2015 | Scheu | B29C 66/24221 |

* cited by examiner

Primary Examiner — James Sells
(74) Attorney, Agent, or Firm — Marshall, Gerstein & Borun LLP

(57) ABSTRACT

The invention relates to a sonotrode for the ultrasonic welding of plastic components of an electronic cigarette.
The sonotrode comprises: a body comprising a first end which can be connected to an ultrasound generator, and a second end; a cavity that develops from the second end towards the first end, for receiving at least partially a plastic component of an electronic cigarette to be welded. The cavity defines an opening at the second end of the body, communicating with the outside of the sonotrode.
In particular, at the opening, the cross section of the cavity has an outline comprising: a first portion that has the shape of a first arc of a reference circumference, which comprises a first end and a second end, opposite each other; and a second portion, that has the shape of a second arc of said reference circumference, which comprises a first end and a second end, opposite each other.
The aforementioned outline further comprises: a third portion, connected to the first end of the first portion and to the first end of the second portion, which develops externally with respect to the reference circumference; and a fourth portion, connected to the second end of the first portion and to the second end of the second portion, which develops externally with respect to said reference circumference.

12 Claims, 4 Drawing Sheets

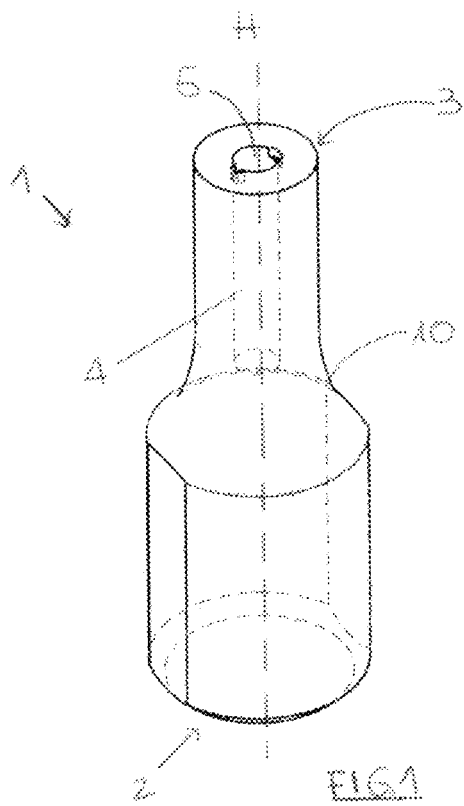
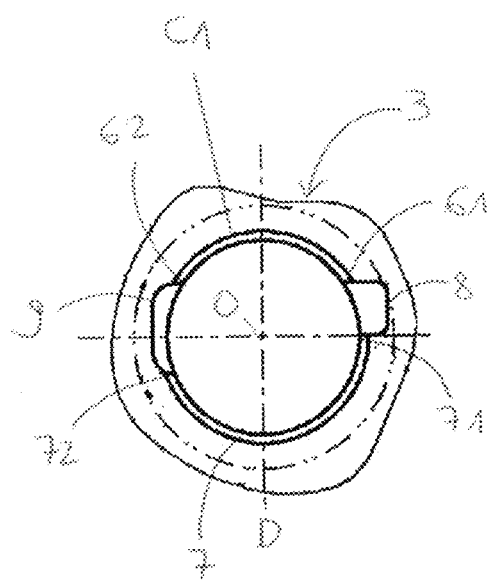
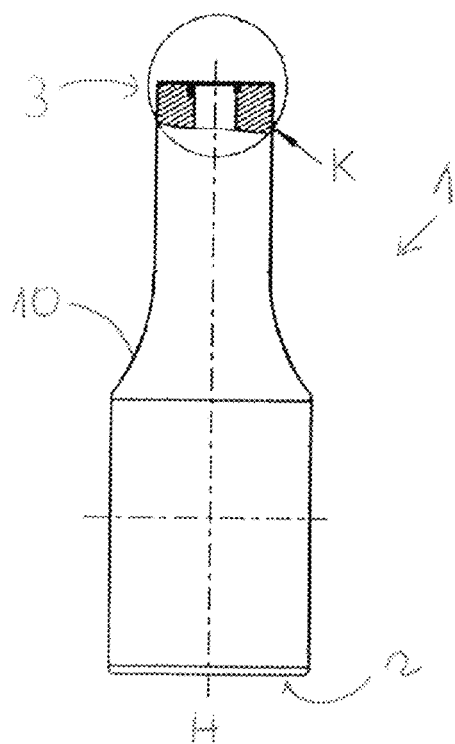
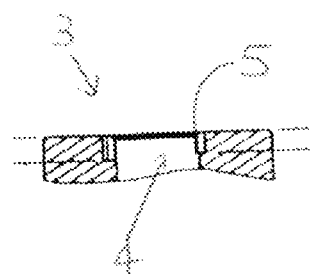
FIG. 3

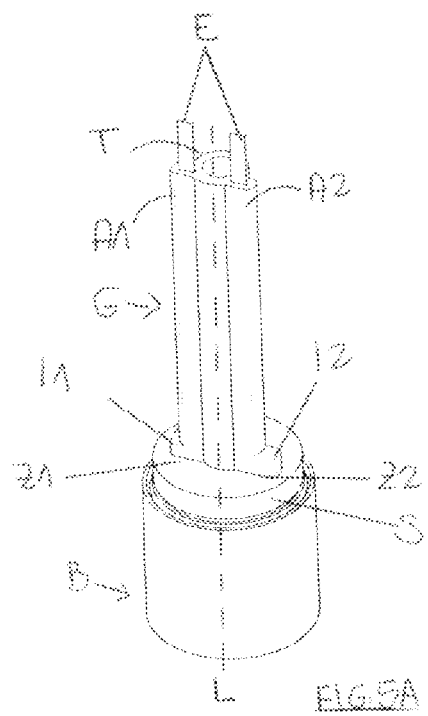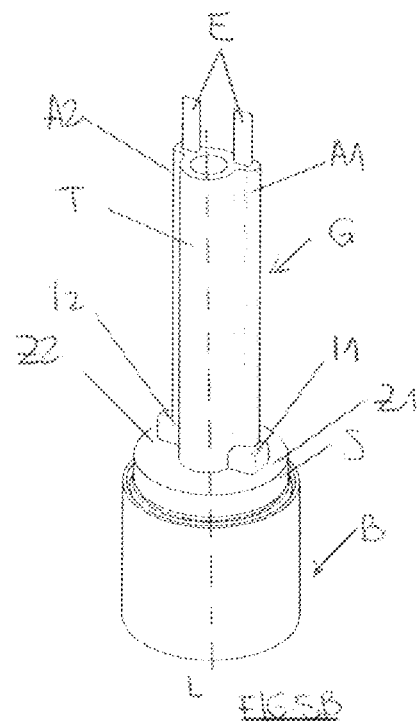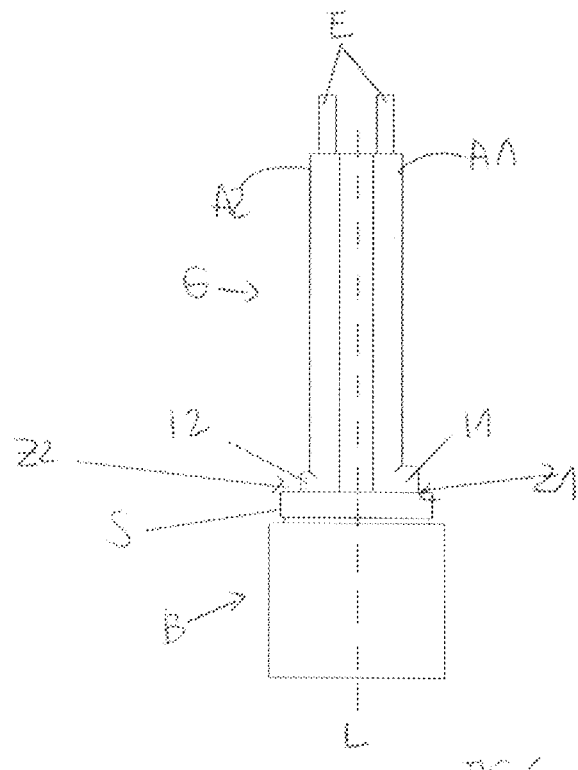

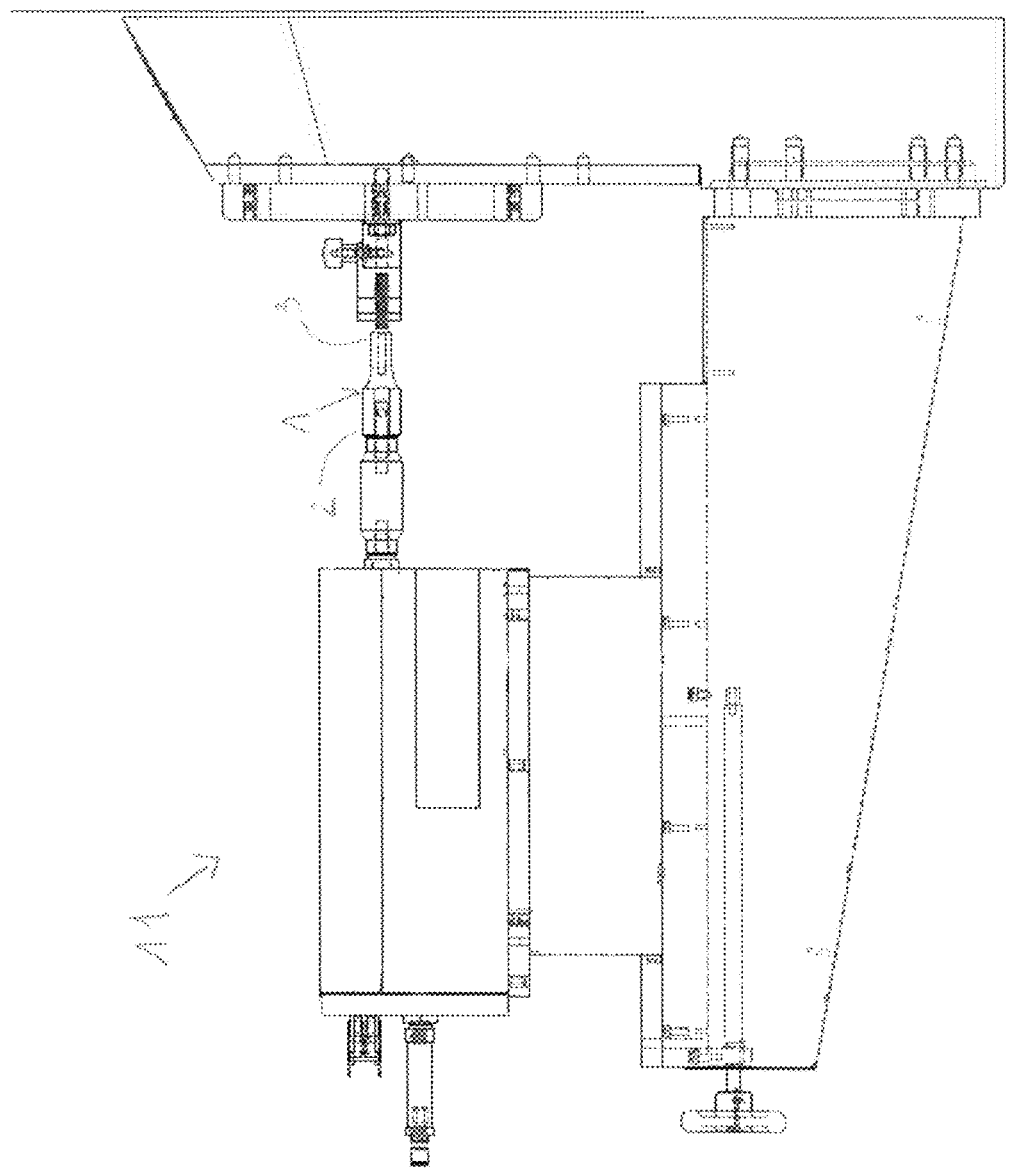

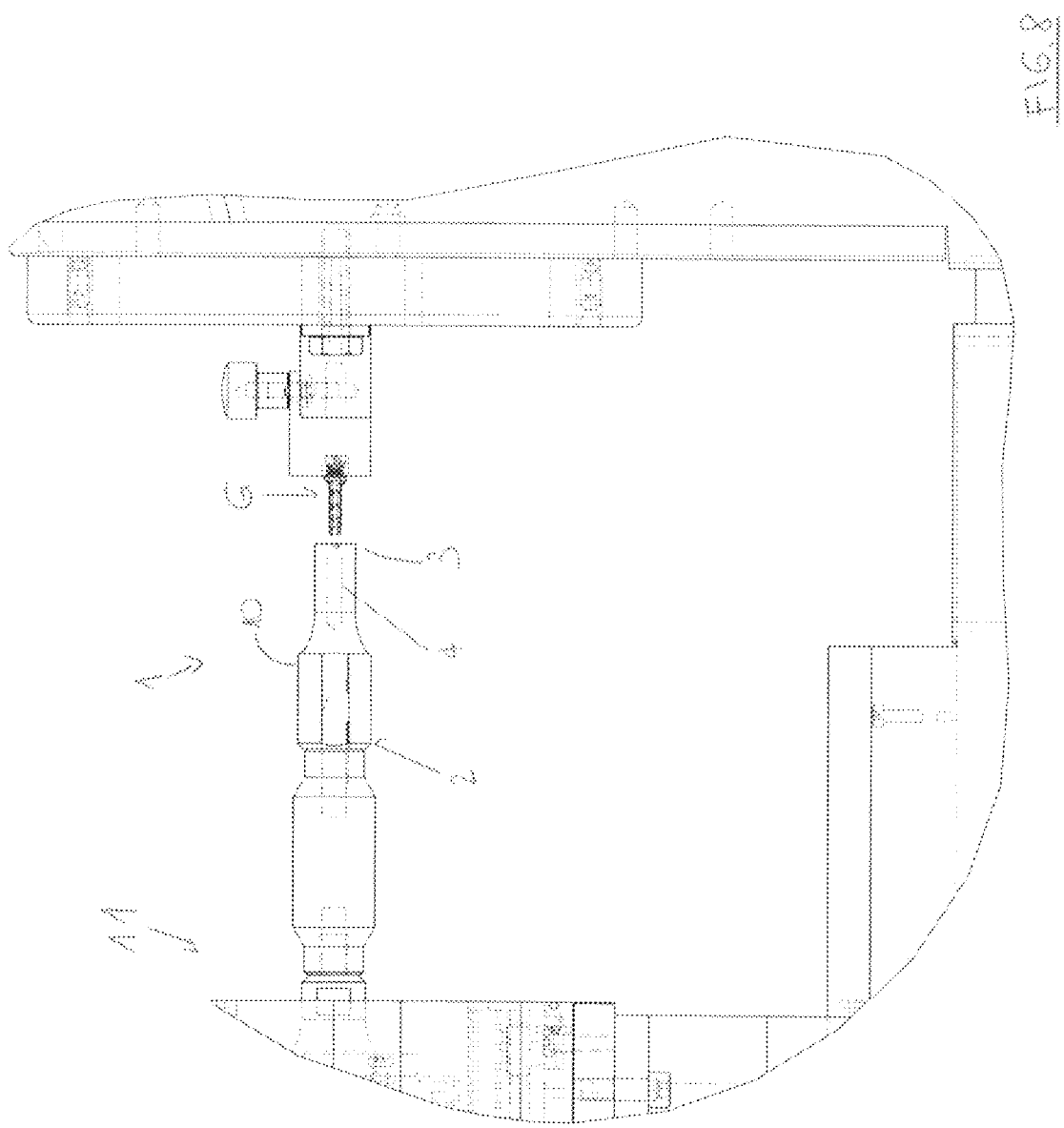

SONOTRODE FOR THE ULTRASONIC WELDING OF PLASTIC COMPONENTS OF AN ELECTRONIC CIGARETTE

The present invention falls within the technical field of electronic cigarettes. In detail, the invention relates to a sonotrode for the ultrasonic welding of plastic components of an electronic cigarette.

BACKGROUND OF THE INVENTION

As known, an electronic cigarette allows the vaporization of a solution (usually water-based, propylene glycol and glycerol) by heating the same by means of, precisely, electrical energy.

In detail, an electronic cigarette comprises a rechargeable battery for supplying electrical energy to a pair of terminals. These latter are fixed to a resistor, which comprises a plurality of coils wound on a wick soaked with the solution to be vaporized. The activation of the battery which supplies the terminals causes the heating of the resistor, until the vaporization of the solution takes place.

The electronic cigarette also comprises an airflow channel, which protrudes from a support element of plastic material, through which the vaporized solution, together with air, can be inhaled by a user.

From the support element two attachments also protrude, made of plastic material as well, inside which the terminals are housed (one for each attachment). In detail, the terminals protrude with a respective end beyond the attachments, in order to be welded to the coils of the resistor, whereas at the opposite ends they carry connectors, for the connection with the rechargeable battery.

The presence of these connectors causes the attachments, in order to cover the connectors at least partially, to form each an enlarged portion (i.e. a protrusion with respect to their development) at the connection zone with the support element.

The group made of plastic material just described (which is obtained by moulding) is fixed, at the respective support element, to a base, generally having a cylindrical section and being made of plastic material as well.

In particular, the fixing of the plastic base to the support element (and therefore to all the above mentioned group) can take place by means of ultrasonic welding.

The ultrasonic welding, as known, uses high-frequency sound energy to fuse plastic materials to each other at a welding zone. During the respective welding, the components to be welded (for example, the base and the group, to which the terminals are already fitted), are held together under pressure and subjected to ultrasonic vibrations.

For this purpose, a welder is used comprising: a generator, which transforms the low frequency network energy by raising the same to a higher frequency, thus producing vibrations; a converter, to transform the vibration mechanical energy at ultrasonic frequencies; a booster, which increases the amplitude of the sound waves; a sonotrode, which transmits energy in the form of vibrations to the parts that need to be fixed to each other.

In particular, the sonotrode comprises a head provided with a cylindrical cavity inside of which, during welding, the components to be welded (e.g. in the example proposed above, the airflow channel and the lateral attachments incorporating the two terminals) are partially arranged. The vibrations that the head of the sonotrode transmits onto the components to be welded causes the heating of the same, thus allowing the welding.

However, by means of the sonotrode described above it is not possible to obtain an optimal welding of the plastic components of an electronic cigarette. In fact, the irregular conformation that these components often have (for example, in the case of the base and of the group described above, due to the presence of enlarged portions of the attachments in the connection zone with the support element), only allows a partial control of the welding.

Consequently, with the aforementioned sonotrode inaccuracies in the welding often occur, and, once the components are welded together, these may present in certain areas unwanted excess of material, or non-continuous welding can occur.

SUMMARY OF THE INVENTION

The object of the present invention is to overcome the drawbacks of the prior art mentioned above.

This object is achieved by proposing a sonotrode for the ultrasonic welding of plastic components of an electronic cigarette according to the accompanying claims.

Advantageously, with the sonotrode according to the invention it is possible to obtain a particularly precise welding of plastic components for an electronic cigarette, also in case of irregular conformations and/or outlines of the same. It is therefore possible to avoid inaccuracies and/or material excesses on components in unwanted areas, once the welding operation is completed. Additionally, with the invention the continuity of the welds is guaranteed, unlike the prior art.

BRIEF DESCRIPTION OF THE DRAWINGS

Specific embodiments of the invention and further advantages will be made apparent in the following disclosure, with the aid of the accompanying figures, wherein:

FIG. 1 illustrates a perspective view of a sonotrode for the ultrasonic welding of plastic components of an electronic cigarette according to the invention, with some internal parts put in evidence;

FIG. 2 illustrates a partial plan view of the sonotrode of FIG. 1;

FIG. 3 illustrates a side view, partially sectioned, of the sonotrode of FIG. 1;

FIG. 4 illustrates an enlarged view of the detail K of FIG. 3;

FIGS. 5A, 5B illustrate each perspective views of some components of an electronic cigarette, welded by means of the sonotrode according to the invention;

FIG. 6 illustrates a front view of the components as referred to in FIGS. 5A and 5B;

FIG. 7 illustrates a side view of an ultrasonic welder according to the invention, during the welding of components of an electronic cigarette;

FIG. 8 illustrates an enlarged view of a detail of FIG. 8.

DETAILED DESCRIPTION OF THE INVENTION

With reference to the attached FIGS. 1-4, 7-8, a sonotrode for the ultrasonic welding of plastic components G, B of an electronic cigarette according to the present invention has been indicated with the reference number 1.

The sonotrode 1 comprises a body 10 having a longitudinal development along an axis H. The body 10 comprises a first end 2 which can be connected to an ultrasound generator, and a second end 3 opposite to the first end 2. The second end 3 contacts at least partially a plastic component G to be welded.

The sonotrode 1 also comprises a cavity 4 that develops from the second end 3 of the body 10 towards the first end 2 of the body 10, along an axis parallel to the longitudinal axis H, for receiving inside the same, at least partially, a plastic component G of an electronic cigarette to be welded (see FIG. 1).

In detail, the cavity 4 defines an opening 5 at the second end of the body 10, communicating with the outside of the sonotrode 1.

In particular, the cross section of the cavity 4, in the area of opening 5, has an outline (i.e. a peripheral edge) which comprises: a first portion 6 that has the shape of a first arc of a reference circumference C1 and which comprises a first end 61 and a second end 62, opposite each other; and a second portion 7, that has the shape of a second arc of said reference circumference C1, which comprises a first end 71 and a second end 72, opposite each other. In detail, the first end 71 of the second portion 7 is proximal to the first end 61 of the first portion 6, and the second end 72 of the second portion 7 is proximal to the second end 62 of the first portion 6.

The aforementioned outline further comprises a third portion 8, connected to the first end 61 of the first portion 6 and to the first end 71 of the second portion 7, which developer externally with respect to said reference circumference C1.

The outline further comprises a fourth portion 9, connected to the second end 62 of the first portion 6 and to the second end 72 of the second portion 7, that develops externally to said reference circumference C1.

In other words, the outline of the opening 5, at the second end 3, is not shaped as a circumference, but only as two arcs of (the same) reference circumference C1 between which are interposed and to which are connected two portions (the above mentioned third portion 8 and the fourth portion 9) protruding towards the outside with respect to the reference circumference C1 (particular reference to FIG. 2 is to be made, wherein the plan view of the opening 5 corresponds to the cross section of the same).

Advantageously, this allows an optimal welding of said plastic components G, B of an electronic cigarette having irregular conformation and/or outline, as will be better specified in the following disclosure.

For example, the plastic components G, B of the electronic cigarette to be welded comprise an airflow group G and a base element B (see FIGS. 5A, 5B, 6).

The airflow group G in turn comprises: a support element S; a tube-shaped portion T which defines an airflow channel and that develops from the support element S along a longitudinal axis L (e.g. perpendicularly to the support element S); and a first attachment A1 and a second attachment A2, bilaterally arranged (i.e. at opposite sides) with respect to the tube-shaped portion T and that develope from the base element S, at a corresponding connection zone Z1, Z2, along longitudinal axes parallel to the development axis L of the tube-shaped portion T (for example, perpendicularly to the support S).

In detail, the first attachment A1 and the second attachment A2 each shape an enlarged portion I1, I2 (i.e. a protrusion with respect to their development) at respective connection zone Z1, Z2 with the support element S (always with reference to FIGS. 5A, 5B, 6).

Preferably, the cavity 4 of the sonotrode 1 is shaped and predisposed for receiving within the same the tube-shaped portion T, the first attachment A1 and the second attachment A2 of an airflow group G. In detail, the third portion 8 and the fourth portion 9 of the outline of the cross section of the opening 5 of the cavity 4 are predisposed and shaped to receive each an enlarged portion I1, I2 of a corresponding attachment A1, A2 of the airflow group G (see FIGS. 1-4).

In other words, the cavity 4 has a shape (as much as possible) complementary to that of the unit formed by the tube-shaped portion T, by the attachments A1, A2 and by the respective enlarged portions I1, I2. This advantageously allows to perform a welding in a particularly controlled manner.

For example, the support element S has a circular outline, and the base member B has a cylindrical section.

For example, the airflow group G is obtained in a single body by means of moulding.

The first attachment A1 and the second attachment A2 may each house, in the inside thereof a metal terminal E of an electronic cigarette (see FIGS. 5A, 5B, 6).

As mentioned in the introductory part of the present text, the terminals E protrude with a respective end beyond the attachments (A1, A2), in order to be welded to the coils of the resistor (not illustrated), which will be used to heat the solution to be vaporized. The terminals E, furthermore, at the opposite end to the abovementioned one each have a connector (not visible), for the connection with the means for supplying electrical energy (e.g. a rechargeable battery, not illustrated).

The presence of these connectors allow the first attachment A1 and the second attachment A2, which cover the connectors at least partially, to necessarily have said enlarged portions I1, I2 at the respective connection zone Z1, Z2 with the support element S.

According to the preferred embodiment of the invention, the cavity 4 comprises a first portion having said cross section previously described, that develops from the second end 3 of the body 10 towards the first end 2 of the body 10, and a second portion that is cylindrical, with the development axis parallel to the development axis H of the body 10; the second portion extends from the first portion towards the first end 2 of the body 10.

Preferably, the reference circumference C1 coincides with the circumference defined by the edge of the second end of the cavity 4.

Preferably, the development axis of the second portion of the cavity 4 passes through the center O of the reference circumference C1.

Still preferably, the development axis of the second portion of the cavity 4 coincides with the development axis H of the body of the sonotrode 1.

According to the embodiment referred to in the enclosed FIGS. 1-4, the third portion 8 and the fourth portion 9 are asymmetrical with respect to a diametrical axis D of the reference circumference C1 (i.e. with respect to an axis passing through the diameter of the reference circumference C1).

Alternatively, according to an alternative not illustrated, the third portion and the fourth portion are symmetrical with respect to a diametrical axis to the reference circumference. Always with reference to the figures, the third portion 8 and the fourth portion 9 are diametrically opposite with respect to the reference circumference C1 (i.e. arranged at opposite ends of the diameter of the reference circumference C1).

For example, the reference circumference C1 has a diameter comprised between 5.5 millimeters and 6.0 millimeters (preferably equal to 5.5 millimeters), and the maximum diametrical distance between the third portion 8 and the fourth portion 9 is comprised between 6.70 millimeters and 6.72 millimeters (preferably equal to 6.71 millimeters).

For example, the maximum distance between the third portion 8 and the center O of the reference circumference C1 is comprised between 3.49 millimeters and 3.59 millimeters (preferably equal to 3.54 millimeters), whereas the maximum distance between the fourth portion 9 and the center O of the reference circumference C1 is comprised between 3.12 millimeters and 3.23 millimeters (preferably equal to 3.17 millimeters).

With reference to the attached figures, the third portion 8 and the fourth portion 9 have a different longitudinal extension one from the other, calculated along the direction of the longitudinal development axis H of the body 10.

This may be due to the fact that the development of the terminals E along the direction of the axis H may be variable as a function of the position in which each terminal E is connected to the supply means (not visible in the drawings), for example by means of a suitable connector (also not illustrated). Practical and/or constructive reasons can, in fact, make necessary the connection of the two terminals E at different positions with respect to said axis H (i.e. at different "heights"). These practical and/or constructive reasons may relate to, for example, the conformation and/or the type of supply means.

Consequently, the development of the third portion 8 and the development of the fourth portion 9 along the direction of the longitudinal development axis H of the body 10 may be asymmetric, considering the start from the second end 3 towards the first end 2 of the body 10.

For example, the third portion 8 may have a longitudinal development along the direction of the development axis H of the body 10 comprised between 1.6 millimeters and 2.1 millimeters (preferably equal to 1.6 millimeters) starting from the second end 3 towards the first end 2 of the body 10.

For example, the fourth portion 9 may have a longitudinal development along the direction of the development axis H of the body 10 comprised between 1.3 millimeters and 1.8 millimeters (preferably equal to 1.3 millimeters) starting from the second end 3 towards the first end 2 of the body 10.

Alternatively, according to an alternative not illustrated, the third portion and the fourth portion may have the same longitudinal development along the development direction of the body, i.e. may have a symmetrical development with respect to the axis direction, considering the start from the second end towards the first end of the body.

Note that, of course, the dimensional ranges indicated above correspond to dimensional ranges of the plastic components to be welded to an electronic cigarette, in particular for the size of an airflow group G described above.

Clearly, the sonotrode 1 described above can be used to weld together other plastic components of an electronic cigarette, such as, for example, the outer tube-shaped containing element to the base element B or the covering element to the outer container.

The invention further relates to an ultrasonic welder 11 comprising a sonotrode 1 according to any of the embodiments described above (see FIGS. 7 and 8).

The ultrasonic welder 11 may comprise, in addition to the sonotrode 1, a generator, to transform the low frequency network energy by raising the same to a higher frequency, thus producing vibrations; a converter, to transform the vibration mechanical energy at ultrasonic frequencies; a booster, which increases the amplitude of the sound waves; a sonotrode, which transmits energy in the form of vibrations to the parts that need to be fixed together.

Clearly, the use of the ultrasonic welder 11 involves the same advantages described for the sonotrode 1.

The invention claimed is:

1. A sonotrode (1) for the ultrasonic welding of plastic components (G, B) of an electronic cigarette, comprising:
   a body (10) having a longitudinal development along an axis (H);
   the body (10) comprising a first end (2) connectable to an ultrasound generator, and a second end (3) opposite to the first end;
   a cavity (4) for at least partially receiving a plastic component (G) of an electronic cigarette to be welded, developing from the second end (3) of the body (10) towards the first end (2) of the body (10) along an axis parallel to said longitudinal development axis (H);
   the cavity (4) defining an opening (5) at the second end (3) of the body (10), communicating with the outside of the sonotrode (1);
   characterised in that:
   the cross section of the cavity (4) at the opening (5) has an outline comprising:
   a first portion (6) that has the shape of a first arc of a reference circumference (C1) and that comprises a first end (61) and a second end (62), opposite each other;
   and a second portion (7), that has the shape of a second arc of said reference circumference (C1) and that comprises a first end (71) and a second end (72), opposite each other; the first end (71) of the second portion (7) being proximal to the first end (61) of the first portion (6), and the second end (72) of the second portion (7) being proximal to the second end (71) of the first portion (6);
   a third portion (8), connected to the first end (61) of the first portion (6) and to the first end (71) of the second portion (7), that develops externally to said reference circumference (C1);
   a fourth portion (9), connected to the second end (62) of the first portion (6) and to the second end (72) of the second portion (7), that develops externally to said reference circumference (C1).

2. The sonotrode (1) of claim 1, wherein the plastic components (G, B) of an electronic cigarette comprise an airflow group (G) and a base element (B); the airflow group (G) comprising: a support element (S); a tube-shaped portion (T) that defines an airflow channel and that develops from the support element (S) along a longitudinal axis (L); a first attachment (A1) and a second attachment (A2), bilaterally arranged with respect to the tube-shaped portion (T) and that develop from the support element (S), at a corresponding connection zone (Z1, Z2), along longitudinal axes parallel to said development axis (L) of the tubular portion (T); each of the first attachment (A1) and the second attachment (A2) having an enlarged portion (11, 12) at the corresponding connection zone (Z1, Z2) with the support element (S);
   in which the cavity (4) of the sonotrode (1) is shaped and predisposed for receiving within the same the tube-shaped portion (T), the first attachment (A1) and the second attachment (A2) of the airflow group (G); in which each of the third portion (8) and the fourth portion (9) of the outline of the cross section of the opening (5) of the cavity (4) is shaped and predisposed to receive an enlarged portion (11, 12) of a corresponding attachment (A1, A2) of the airflow group (G).

3. The sonotrode (1) according to claim 1, wherein the cavity (4) comprises a first portion having said cross section, that develops from the second end (3) of the body (10), and a second portion that is cylindrical, has a development axis parallel to the longitudinal development axis (H) of the body (10), and develops from said first portion towards the first end (2) of the body (10).

4. The sonotrode (1) according to claim 3, wherein the developing axis of the second portion of the cavity (4) passes through the center (O) of the reference circumference (C1).

5. The sonotrode (1) according to claim 1, wherein the third portion (8) and the fourth portion (9) are asymmetrical with respect to a diametrical axis (D) of the reference circumference (C1).

6. The sonotrode (1) according to claim 1, wherein the third portion (8) and the fourth portion (9) are symmetrical with respect to a diametrical axis (D) of the reference circumference (C1).

7. The sonotrode (1) according to claim 1, wherein the third portion (8) and the fourth portion (9) are diametrically opposite with respect to the reference circumference (C1).

8. The sonotrode (1) according to claim 7, wherein the reference circumference (C1) has a diameter comprised between 5.5 millimeters and 6.0 millimeters, and wherein the maximum diametrical distance between the third portion (8) and the fourth portion (9) is comprised between 6.70 millimeters and 6.72 millimeters.

9. The sonotrode (1) according to claim 8, wherein the maximum diametrical distance between the third portion (8) and the center (O) of the reference circumference (C1) is comprised between 3.49 millimeters and 3.59 millimeters; and in which the maximum diametrical distance between the fourth portion (9) and the center (O) of the reference circumference (C1) is comprised between 3.12 millimeters e 3.23 millimeters.

10. The sonotrode (1) according to claim 1, wherein the development of third portion (8) and the fourth portion (9) along the direction of the longitudinal development axis (H) of the body (10) are asymmetrical, evaluated starting from the second end (3) towards the first end (2) of the body (10).

11. The sonotrode (1) according to claim 10, wherein the third portion (8) has a development along the direction of the longitudinal development axis (H) of the body (10) comprised between 1.6 millimeters and 2.1 millimeters, whereas the fourth portion (9) has a development along the direction of the longitudinal development axis (H) of the body (10) comprised between 1.3 millimeters and 1.8 millimeters, evaluated starting from the second end (3) towards the first end (2) of the body (10).

12. The sonotrode (1) of claim 1, wherein the development of third portion (8) and the fourth portion (9) along the direction of the longitudinal development axis (H) of the body (10) are symmetrical, evaluated starting from the second end (3) towards the first end (2) of the body (10).

* * * * *